H. CLEMENT.
LENS CUTTING MACHINE.
APPLICATION FILED MAR. 20, 1914.
1,127,860.
Patented Feb. 9, 1915.
2 SHEETS—SHEET 2.
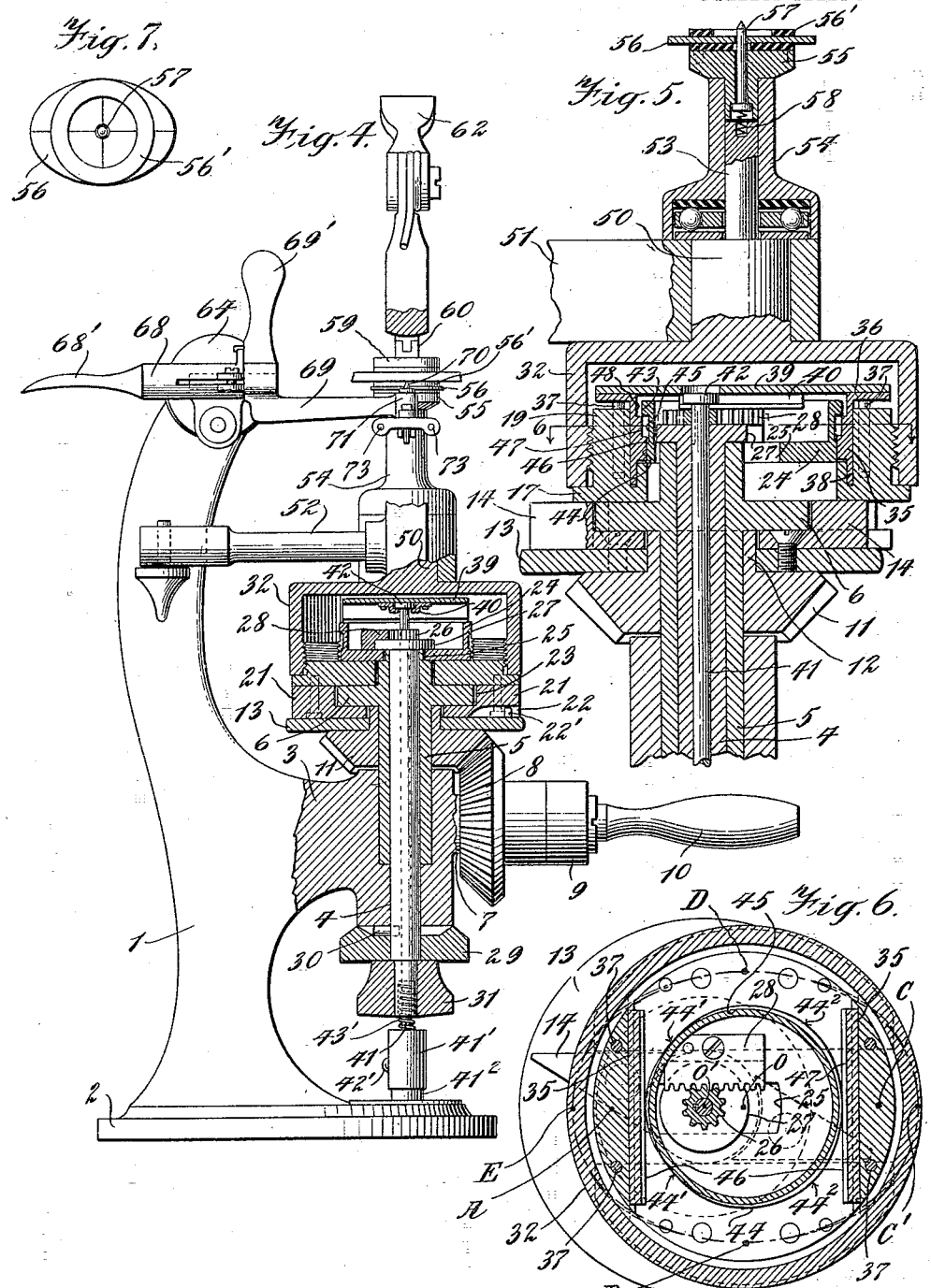

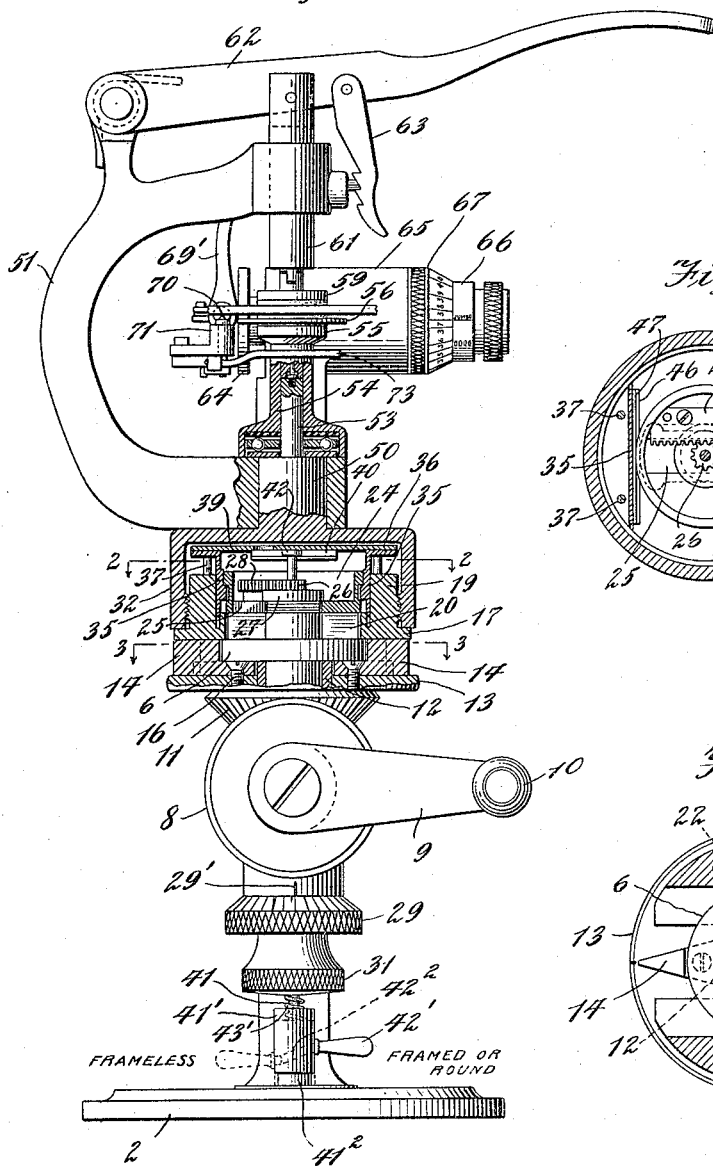

UNITED STATES PATENT OFFICE.

HANS CLEMENT, OF NEW YORK, N. Y., ASSIGNOR TO GENERAL OPTICAL COMPANY, INC., A CORPORATION OF NEW YORK.

LENS-CUTTING MACHINE.

1,127,860.

Specification of Letters Patent.

Patented Feb. 9, 1915.

Application filed March 20, 1914. Serial No. 825,972.

*To all whom it may concern:*

Be it known that I, HANS CLEMENT, a citizen of the United States, residing at the city of New York, in the borough of Bronx and State of New York, have invented certain new and useful Improvements in Lens-Cutting Machines, of which the following is a full, clear, and exact description.

This invention relates to lens cutting machines for cutting lenses adapted for use with spectacles and eyeglasses. Lenses, other than true circular lenses, which are mounted in rims differ in shape from those adapted for use without rims or with the so called rimless glasses, the former being of true elliptical shape, while the latter are of general elliptical outline but differing from a true ellipse in that the ends are of fuller curvature. This difference in shape is slight but is regarded as essential so that the lenses will conform to the standard shapes of lenses adopted by the optical trade.

In the Patent No. 1,029,367, issued June 11, 1912, a machine is shown for cutting lenses, either of circular or true elliptical outline without the aid of templets or other gages to guide the diamond point and one of the objects of the present invention is to adapt the machine therein disclosed, to cut lenses of generally elliptical shape but of greater curvature at the ends than a true ellipse, or, in other words, having the shape of a lens formed by uniting the larger ends of two similarly shaped ovals which are adapted to be used with rimless glasses, which lenses, in so far as I am aware, have heretofore been cut by utilizing templets or other gages for guiding the diamond point.

Another object of the invention is to provide a universal lens cutting machine or one which may be readily adjusted to cut circular, true elliptical, or double oval shaped lenses, which machine may be readily adjusted to cut a lens of any desired size and ellipticity by simple adjustments which are capable of being made by one comparatively unskilled in the optical art.

A still further object of the invention is to provide an improved centering device, for correctly positioning the lens between the chucks of the movable lens clamping device.

With these and other objects in view, my invention consists of the construction and combinations which will be hereinafter described in detail in the specification and particularly pointed out in the appended claims.

In the accompanying drawings, Figure 1 is a front elevation, partly in section, of a machine constructed in accordance with and embodying the principles of my invention; Figs. 2 and 3 are horizontal sections taken through the driving mechanism on the lines 2—2 and 3—3 of Fig. 1, respectively; Fig. 4 is a side elevation, partly in section, of the machine disclosed in Fig. 1; Fig. 5 is a detail of the driving mechanism, the same being shown in a position to cut elliptically-shaped lenses for rimless glasses; Fig. 6 is a section of Fig. 5 taken on the line 6—6; and Fig. 7 is a detail showing the centering device.

The machine hereinafter to be described is in general similar to that shown in the patent above referred to, whose construction will be described broadly and the novel features of the present invention brought out in detail in order to thoroughly explain the invention.

The main frame or standard 1 of the machine has a suitable base 2 and a laterally-extending arm 3 through which passes a vertical spindle 4. Surrounding the spindle is a sleeve 5, the upper portion of the arm 3 being recessed to receive the same and to which, the sleeve is secured to prevent its rotation. The sleeve 5 extends upwardly and is provided with a flange 6, the purpose of which will be hereinafter described. A stud 7 projecting laterally from the arm 3, carries a beveled gear 8 which is rotated by means of the crank arm 9 having a suitable handle 10, the gear 8 meshing with a corresponding beveled gear 11, mounted on the sleeve 5 directly above the upper surface of the arm 3. The beveled gear 11 has a hub 12 and fitting around this hub is a plate 13 which is fastened to the gear 11 in any suitable manner. The plate 13 has secured to its upper face, two triangularly-shaped members 14, the upper inner surfaces of which are recessed to receive the flange 6 while their inner sides are curved to conform to the curvature of the hub 12.

A disk 17, the upper peripheral surface of which is threaded, carries upstanding segmental shaped lugs 19 and is slotted as at 20, through which slot the upper end of the sleeve 5 passes, the walls of the slot serving as a guide for the disk when the latter is oscillated. The disk 17 also carries two depending segmental shaped bearing pieces 21 which are slidably mounted on the plate 13, one of which segments is slotted on its bottom surface as at 22 (see Fig. 4) for the reception of a pin 22', which projects from the upper surface of the plate 13.

The bearing pieces 21 are recessed as at 23, in which recess the flange 6 slidably fits, the disk 17 having an oscillatory movement on the plate 13, which will be referred to in the operation of the machine.

The upper end of the sleeve 5 is squared and carries a cam disk 24 which is slotted as at 25, the squared end of the sleeve 5 fitting into the said slot, permitting lateral displacement of the cam disk, but preventing it from rotating, the cam disk being displaced laterally with respect to the sleeve 5 by means of a small pinion 26 which is secured to the end of the spindle 4. A collar 27 is provided on the spindle immediately below the pinion which collar engages the upper part of the cam disk 24 and holds it in proper position thereon, the cam disk being provided with a central circular recess in which the collar 27 and pinion 26 are positioned, the walls of the recess forming a flange around the periphery of the cam disk upon which is provided a plurality of cam surfaces as will be hereinafter described. A rack 28 is secured to the disk 24 and located in the circular recess therein, which rack meshes with the pinion 26 so that upon rotation of the pinion, the cam disk will be displaced eccentrically with respect to the axis of the same, the slot 25 being cut eccentrically to the center of the disk to permit this movement.

The pinion 26 keyed to the spindle 4 is rotated by means of an adjusting sleeve 29 keyed to the spindle 4 at its lower end by means of a pin 30, which adjusting sleeve 29 is locked in its desired position by means of a lock-nut 31 threaded on the lower end of the spindle 4.

A cap member 32 is threaded on to the disk 17 and serves to connect the driving mechanism to the movable lens clamping device, the construction of the driving mechanism described being similar to that shown in the former patent.

Referring now to the construction whereby either lenses for rimmed or rimless glasses may be cut, in the patent referred to the upstanding lugs 19 were in direct contact with the entire cam surface of the cam disk 24 at diametrically opposed points, the surface of the cam disk 24 having a true circular outline. In the present construction, cam engaging plates 35 which are adapted to slide on the inner vertical walls of the upstanding lugs 19 are provided. These plates have right angled projections 36 at their upper ends to which are secured depending pins 37 which pins have a sliding fit in suitable apertures in the segmental lugs 19 and serve as guides to properly maintain the cam engaging plates 35 against the vertical walls of the segmental lugs, the lower ends 38 of the plates fitting into slots cut in the disk 17 which aid in the proper maintenance of the plates in position.

The right angled portions 36 are connected by means of a bridge plate 39 which has secured to its under surface, medially thereof, the channel plates or guides 40. A rod 41, which extends upwardly through the hollow spindle 4 and the pinion 26 is provided at its upper extremity with a circular head 42 which fits into the guides 40 so that the bridge plate 39, and hence the cam engaging plates 35 will be forced to move upon movement of the rod 41 in either direction. The lower end of the rod 41 is rigidly secured to a cap member 41' which fits over a cylindrical part $41^2$, the cap member 41' being provided with a handle 42' and carries a pin which rides in an inclined slot $42^2$ cut in the peripheral surface of the cylinder $41^2$. The cap member is normally urged to its lowermost position by means of a helical spring 43' which fits around the rod 41', one end of which projects against the cap member 41 while the other end fits into a recess provided in the end of the hollow spindle 4. The inclined slot is formed with a locking slot at the upper end of its inclined part so that when the handle 42' is thrown into its upper position, it will remain in that position until it is again positively actuated, the parts described forming a clutch for shifting the position of the cam engaging plates 35.

As is more clearly shown in Fig. 5, the cam 24 instead of being provided with one cam surface on its outer periphery, has two cam surfaces 43 and 44, respectively, which are separated by means of an annular recess 45. The upper cam surface 43 is similar in shape to that used in the former machine which is adapted to cut lenses for rimmed glasses, being of true circular outline, while the lower cam surface 44 is of irregular outline and forms a part of the mechanism for cutting lenses for the rimless glass.

As is shown in Fig. 6, the cam surface 44 has two low spots 44' and two high spots $44^2$ forming a substantial oval-shaped cam whose major axis is parallel to the walls of the slot and passes through the center of the spindle 4. The cam engaging plates 35 are each provided with surfaces 46 and 47 which are arranged out of vertical alinement and are adapted to contact with the peripheral surfaces 43 and 44 respectively at diametrically-opposed points thereon, the upper parts of the cam engaging plates 35 being cut away at 48 so as to prevent contact between the cam surface 43 and the surface 47 when the cam surface 44 is in contact with the surface 46.

The cap member 32 which is mounted in the disk 17 carries a centrally disposed cylindrical extension 50 on which is journaled the lower extremity of a C-shaped frame 51 which frame carries a bifurcated rod 52, the bifurcated portion of which is received by a pin carried by the frame 1 to prevent the rotation of the C-shaped frame while permitting it to have an oscillatory movement. A stem 53 projects from the cylindrical extension 50 and surrounding the stem is a sleeve 54 which is mounted for rotation independently of the C-shaped frame and is provided with suitable ball-bearings for reducing the friction upon relative rotation of these parts.

The sleeve 54 is secured to the stem 53 and therefore moves in a rotary translatory path, which movement is imparted to it by the driving mechanism, as will be clearly described in the operation of the machine. Fitted into the upper end of the sleeve 54 is a clamping chuck 55 comprising a stem and a disk portion, the disk portion carrying a disk of ivory, celluloid or like material interposed between two yielding disks. The disk 56 is elliptical in shape and has cross lines or hairs thereon as clearly shown in Fig. 7 which aid in the proper centering of the lens on the same, since the lens is provided with corresponding cross lines which in centering the lens before clamping it in position are brought into alinement with the cross hairs on the disk. However, since it is necessary to place on the disk 56 an annular member 56' of rubber or other yielding material forming a seat for the lens, the proper alining of the cross hairs on the lens and disk is difficult. In order to eliminate this difficulty a yielding center, which forms one of the features of the present invention, is utilized and comprises a pin 57 inserted in a suitable aperture centrally disposed in the chuck 55, the lower end of the pin being headed and fitting in an enlarged recess in the stem of the chuck. The pin is normally held just above the plate of the annular member 56' by means of a spring 58, one end of which fits into a recess in the top of the stem 53, while the other end bears directly against the head of the pin. The chuck 55 is secured to the sleeve 54 by a set-screw, or in any other manner, so that it will be forced to rotate therewith.

Positioned directly above the chuck 55 is a complementary chuck 59 which is universally mounted on a plunger 60 yieldingly mounted in a power arm 61 which is moved by means of the hand lever 62 pivoted at one end to the C-shaped frame 51. The lens is placed on the chuck 55 and correctly centered thereon as described and the lever 62 is then manually moved downwardly to force the chuck 59 into firm engagement with the lens, the center 57 yielding sufficiently to prevent the breakage of the lens after the desired tension has been placed upon it by means of the chuck 59, after which this chuck is locked in its engaged position by means of the latch 63.

The diamond point and associated mechanism for cutting the lens is practically identical with that shown in the former patent and comprises broadly a sliding member 64 which is fitted into a sleeve 65 which sliding member is displaced laterally by means of the micrometer screw attachment 66, the specific construction of which is common and need not be described in detail, but it may here be noted that the screw of the micrometer screw-attachment carries a graduated dial plate 67 upon which is marked the various sized lenses to be cut, it being apparent that the movement of the sliding member 64 laterally will increase the diameter of a circular lens and the axes of an elliptical or oval lens. Pivotally secured to the end of the sliding member 64 is an arm 68 which has a finger 68' at its free end by which the arm may be rocked and at its other end carries a second arm 69 which is pivoted thereon to rotate at right angles to the pivot of the arm 68. The arm 69 carries a finger engaging portion 69' whereby this arm may be tilted to move a diamond 70 carried in a rotatable holder 71 mounted on the arm 69 out of a vertical plane so that the cutter may be arranged normally to the surface of a lens such as "toric" or other lenses of heavy convex or concave curvature. The diamond holder 71 is rotatably mounted at the end of the arm 69 and is oscillated by means of the fingers 73 which tangentially engage the sleeve 54 at diametrically opposed points whereby the same cutting point of the diamond is maintained in contact with the lens during its movement in a rotary translatory path, this construction being described in detail in the former patent.

The operation of the machine will be described first for cutting circular lenses then for true elliptical and finally for elliptical lenses of full curvature at the ends.

To cut circular lenses the mechanism is in the position shown in Figs. 1 and 4, that is, the handle 42' has been thrown to the right hand side of the figure which position is marked on the base "Framed or round" as has been indicated on Fig. 1. The cap 41' is by this movement of the handle 42' forced upwardly by the engagement of the pin of the inclined slot $41^2$ which motion is transmitted through the rod 41 to the bridge plate 39 raising the cam engaging plates 35 to bring the surfaces 47 into engagement with the cam surface 43. As has been described, the cam surface 43 is circular in outline and in cutting circular lenses the cam disk 24 is arranged with its center corresponding to the center of rotation of the disk 17. The cap member 32 will therefore receive through the driving mechanism for rotating the disk 17, a simple rotary movement and a circular lens of the desired size may be cut by moving the diamond 70 radially toward or away from the center of the chuck 55.

To cut a lens of true elliptical outline, the machine is adjusted similar to the manner described in the former patent hereinbefore referred to. The adjusting screw 29 is turned, rotating the spindle 4 and pinion 26 which engages with the rack 28 to displace the cam 24 the desired amount, the amount of displacement being determined by a graduated dial carried by the adjusting screw 29 registering with a mark 29' on the frame. Screw 29 is then locked in place by the lock-nut 31.

Referring to Fig. 6, the cam 24 is shown displaced a distance O O', O designating the center of the cam and O' the center of rotation of the plate 13 upon which the cam disk 17 is slidably mounted. Let E denote a position corresponding to the relatively stationary diamond point 70 which, in the structure disclosed, lies in the line passing through the centers O O', which line also defines the direction of lateral displacement of the cam 24. Let A, B, C and D, denote the four points located on the cam disk 17 preferably 90° apart and located on the circumference of a circle having its center at O. Since the movable lens clamping device is rigidly connected to the cam disk 17 and moves freely therewith, it is obvious that four points respectively positioned directly above the points chosen on the lens blank clamped between the chucks of the moving lens clamping device will move in the same path relatively to the diamond point 70, and the circle described through the points would give the size of a true circular lens which would be cut if the centers O and O' were concentric. In the position shown in Fig. 6, since the plane surfaces 46 of the plates 35 are tangent to the circular surface 43 of the cam 24 at diametrically opposed points which lie in the line of direction of lateral displacement of the cam 24, the disk 17 and associated parts are in their position of greatest eccentricity or displacement. The point A instead of occupying the position E which it would if the center of the cam O and the center of rotation O' were concentric, will be displaced therefrom a distance E—A, which is obviously equal to the distance O O'. Suppose the plate 13 and the disk 17 are rotated a quarter of a revolution in a clockwise direction, as viewed in Fig. 6, the disk 17 will then be at right angles to the position it now occupies with respect to the stationary cam 24 and the point B will then be in alinement with the line passing through the centers O O'. Since the cam 24 is displaced in the direction of the line O O', the disk 17, when at right angles to the position it now occupies, will be in the same position with respect to the diamond point as it would occupy if the centers of the cam and disk were concentric. The point B will, when in alinement with the lines passing through the centers O O', therefore, coincide with the point marked E rather than the point marked A. Since the surface 45 which is engaged by the plane surfaces 47 of the plate 35 is of true circular outline, the intermediate points on the circumference of the circle between the points A and B, when successively brought into alinement with the line passing through the centers O O', will gradually approach the point E, the cam disk 17 having a translatory movement as well as a rotary one, which translatory movement is gradual since it is produced by the rotation of an element around a circle eccentric to the axis of rotation of the element. At the end of the second quarter of the revolution of the cam disk 17, the point C will occupy the position now occupied by the point A, or, in other words, the positions of the parts will be the same with the exception that the positions of the points A and C are reversed. The cam disk 17 and the points on the circle between B and C during this quarter revolution will therefore recede from the position in which the points B and E are concentric until they again reach the position of greatest displacement or eccentricity, as is shown in Fig. 6, the amount which the point C is displaced being designated C C', or, in other words, the cam disk 17 makes one complete oscillation during one-half a revolution. At the end of the third quarter of the revolution, the point D will be concentric with the point E, the cam disk 17 gradually approaching the point E similar to the manner described for the first quarter of the revolution. The last quarter of the revolution is similar to the second quarter, the cam disk 17 gradually recedes until it reaches its point of greatest displacement, completing the second oscillation of the cam disk 17. It is obvious, therefore, that the outline of a curve inscribed upon a lens by a stationary diamond point located at the point E will be an ellipse whose major axis is E—C', and whose minor axis is B—D, the distance O—O' being one-half the difference between the major and minor axes, the amount of displacement of the cam 24 thus determining the eccentricity of the ellipse to be cut.

To cut lenses adapted for use with rimless or frameless glasses, the handle 42' is thrown from its right-hand position as shown in Fig. 1, to its dotted line position. The pin carried by the handle 42' rides in the inclined slot 42² and the cap 41' moves downwardly under the tension of the spring 43'. This downward movement is transmitted to the rod 41 which moves the plates 35 downwardly to the position shown in Fig. 5 wherein the surfaces 46 carried by the plates 35 are in engagement with the cam surface 44 at diametrically opposed points. The operation is similar to that described for true elliptical lenses and referring to Fig. 6, it will be seen that the cam surface 44 is provided with low spots 44' which occupy practically the middle third of the two quadrants facing the point E, and high spots 44² occupying diametrically opposed positions on the other two quadrants. Assuming that the parts are in the position shown in Fig. 6, during the first third of the first quarter of a revolution the movement of the cam disk 17 and associated lens clamping device is similar to that for cutting true elliptical lenses. Upon the second third of this quarter, the surfaces 46 will engage the low and high spots 44' and 44², of the cam at diametrically opposed points. Assuming that the direction of rotation is clockwise, the translatory movement of the cam disk will therefore be retarded during this period, and the intermediate points occupying the middle third of the quadrant of the circle passing through the points A and B will approach the point E at a slower speed than in the case where a true ellipse is being cut resulting in the inscribing of a curve of greater curvature between these points, which curve extends outwardly beyond the curve of a true ellipse, adding a small crescent shaped piece thereto, as is clear from Fig. 6. For the last third of the first quarter, the translatory movement of the cam disk will be similar to that for a true ellipse and the curve traced by the point E will be coincident with a true elliptical curve. At the beginning of the second quarter of the revolution the point C occupies the position now occupied by the point marked B, and the curve traced for the first third of this quarter is similar to a true ellipse. On the second middle third of the quarter the surfaces 46 will again engage with the high and low spots 44 and 44², respectively. During the second quarter of a revolution, the translatory movement of the cam disk 17 is away from the point E as has been described in the operation of cutting a lens of true elliptical shape. The recession of the cam disk is therefore retarded for the second third of the second quarter and the points occupying the middle third of the quadrant B—C will therefore recede from the point E at a slower speed than in the case of the inscribing of a true ellipse, resulting in the addition of a second crescent shaped piece to the curve between these points, similar to that described for the first quarter of the revolution. The movement of the cam disk 17 for the second half of the revolution is similar to that described and the resulting curve which will be inscribed upon the lens by a diamond point located above the point E is shown on Fig. 6, the curve being similar in shape to a curve which would be formed by the joining together of the larger halves of two similarly shaped ovals, and the term "double oval" used in the appended claims, is intended to cover a curve of this shape.

To cut either elliptical or double oval lenses of any desired ellipticity and size it is obvious that by merely changing the position of the diamond point 70 the size of the lens may be varied, and the same read off the graduated dial 67, while by displacing the cam 24 the desired amount by rotating the adjusting screw 29, any desired ellipticity may be obtained, the amount of displacement or ellipticity being determined from the graduated dial 29' carried by the adjusting screw.

While I have shown a cam surface 44 for cutting lenses of special curvature adapted to conform to the standard shape which has been adopted by the trade, it is evident that by changing the shape of the cam surface a lens of any desired outline may be cut and it is not my intention to limit the invention to a cam of the specific shape shown unless the shape of the lens be specified.

I claim:—

1. In a lens cutting machine, a frame, a movable lens clamping device for holding the lens to be cut, driving mechanism operatively associated therewith and supported by said frame, said driving mechanism comprising a rotary part, a member slidably mounted thereon and adapted to rotate therewith, and a cam adapted to be displaced to a position eccentric to the axis of rotation of said rotary part, said cam having a cam-surface of non-circular outline with which said member is maintained in slidable engagement.

2. In a lens cutting machine, a frame, a movable lens clamping device, a cutter relatively stationary with respect to said clamping device, driving mechanism for said device comprising a rotary part, a member slidably mounted thereon and adapted to rotate therewith, and a cam adapted to be displaced to a position eccentric to the axis of rotation of the rotary part, said cam having a cam surface of irregular outline with which said slidable member engages, the outline of said cam being such that a double oval shaped lens will be cut by the operation of the driving mechanism and the pressing of the stationary cutter against the lens.

3. In a lens cutting machine, a movable clamping device for holding the lens to be cut, driving mechanism operatively associated therewith for imparting to said clamping device a combined rotary oscillatory motion said driving mechanism including means for varying the speed of the oscillatory motion in determined parts of its path without varying the length of the same.

4. In a lens cutting machine, a movable clamping device for holding the lens to be cut, a driving mechanism operatively associated therewith for imparting to said clamping device a rotary oscillatory motion, said driving mechanism including means for varying the speed of the oscillatory motion in determined parts of the path without varying the lengths of the same comprising a rotary part, a member slidably mounted thereon and adapted to rotate therewith and a plurality of cams of different outlines, and means for moving said slidable member into slidable engagement with said cam-surfaces, respectively.

5. In a lens cutting machine, a movable clamping device for holding the lens to be cut, driving mechanism operatively associated therewith for imparting to said clamping device a rotary oscillatory motion, said driving mechanism comprising a rotary part, a member slidably mounted thereon and adapted to rotate therewith, a plurality of separate cams, cam engaging surfaces carried by said member, each of said surfaces being adapted to engage with one of the cams, respectively, and means for moving corresponding cam engaging surfaces and cams into engagement with each other.

6. In a lens cutting machine, a movable clamping device for holding the lens to be cut, driving mechanism operatively associated therewith for imparting to said clamping device a rotary oscillatory motion, said mechanism comprising a rotary part, a member slidably mounted thereon and adapted to rotate therewith, a cam adapted to be displaced to a position eccentric to the axis of rotation of the rotary part, means for displacing said cam, said cam having a plurality of separate cam surfaces thereon, a plurality of cam engaging surfaces carried by said member, each of said surfaces being adapted to engage with a corresponding cam surface and means for moving one of said cam engaging surfaces into engagement with its corresponding cam-surface and for moving the other of said cam engaging surfaces out of contact with the other of said cam-surfaces.

7. In a lens cutting machine, a clamping device for holding the lens to be cut, comprising two members, means for clamping the lens between said members and a yielding center carried by one of said members.

8. In a lens cutting machine, a clamping device for holding the lens to be cut, comprising two members and means for clamping the lens between said members, an elliptical-shaped disk with cross hairs thereon mounted on one of said members, an annular seat for the lens mounted on said disk and a yielding center mounted in said member and passing through said disk to a point beyond the outer surface of the annular seat.

In witness whereof, I subscribe my signature, in the presence of two witnesses.

HANS CLEMENT.

Witnesses:
WALDO M. CHAPIN,
JOSEPH BUCKLEY.

Copies of this patent may be obtained for five cents each, by addressing the "Commissioner of Patents, Washington, D. C."